UNITED STATES PATENT OFFICE.

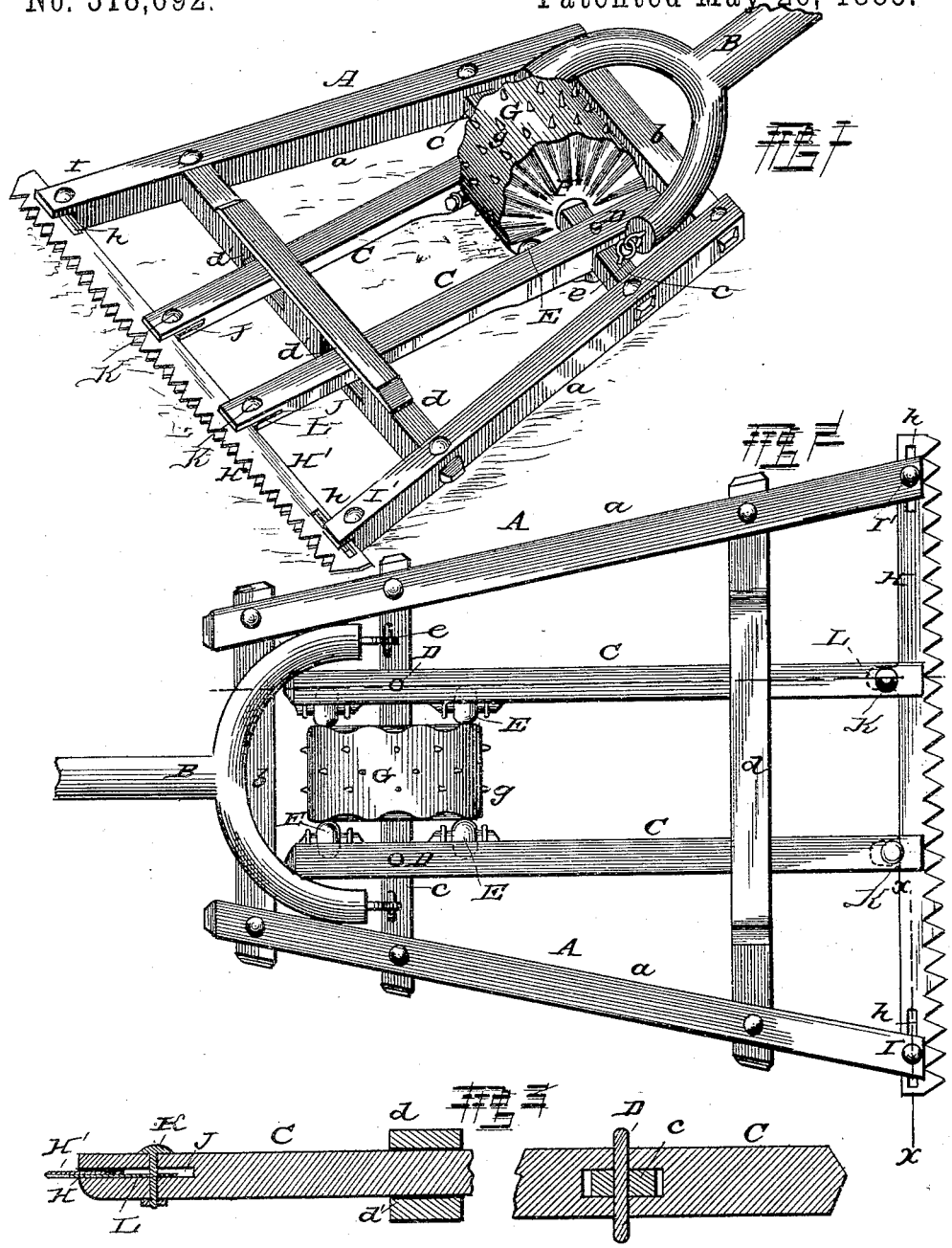

LAURISTON S. BROWN, OF ORISKANY FALLS, NEW YORK.

FIELD AND LAWN MOWER.

SPECIFICATION forming part of Letters Patent No. 318,692, dated May 26, 1885.

Application filed April 16, 1884. (No model.)

*To all whom it may concern:*

Be it known that I, LAURISTON S. BROWN, a citizen of the United States, and a resident of Oriskany Falls, in the county of Oneida and State of New York, have invented certain new and useful Improvements in Field and Lawn Mowers; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved field or lawn mower. Fig. 2 is a top or plan view of the same. Fig. 3 is a longitudinal sectional view through one of the movable arms or levers, and Fig. 4 is a cross-section through line $x$ $x$ in Fig. 2.

Similar letters of reference indicate corresponding parts in all the figures.

My invention has relation to lawn and field mowers; and it consists in the improved construction and combination of parts of a machine of that class, as will be hereinafter more fully described and claimed.

In the accompanying drawings, A denotes the frame of the machine, which consists of diverging side pieces, $a$ $a$, connected by cross-pieces $b$, $c$, and $d$.

B is the handle for operating the machine, the bifurcated end of which is hinged at $e$ upon the cross-bar $c$. The cross-bar $d$, near the outer end of the frame, has two slots, $d'$ $d'$, for the insertion of the movable arms C, which are pivoted upon bolts D, inserted through the fixed cross-bar $c$. The arms C are provided each with a pair of friction-rollers, E, bearing against the scalloped sides or faces F of the drive-wheel or roller G, the circumference of which is provided with teeth or projections $g$; or it may be ribbed or serrated to get a firm hold upon the ground in operating the machine and prevent it from slipping.

Fastened in the outer ends of the arms C are the reciprocating cutter-plates H and H', the outer ends of which have slots $h$, through which the guide-bolts I and I', at the outer ends of the diverging arms or sides $a$, are inserted.

The outer ends of the arms C, which operate the cutters, are slotted or recessed, as shown at J in Fig. 3, to make room for the perforated tongues L of the cutter-blades, through which tongues pass bolts K, pivoting the blades to the arms, the cutter-blades, in operating the machine, reciprocating in opposite directions, thus cutting the grass or grain between their projecting teeth as the machine is advanced over the lawn or field.

This machine is particularly applicable to cut the grass under hedges, bushes, or plants, where a rotary lawn-mower of the ordinary construction cannot be readily introduced; and by manipulating the handle so as to tilt the machine upon its drive-wheel the cutters may be raised or lowered to any desired elevation above the ground.

It will also be seen that the machine is exceedingly simple in its construction, so that there is no danger of its getting out of order, and that the cutters can be readily sharpened whenever required.

Having thus described my invention, I claim and desire to secure by Letters Patent of the United States—

The combination of the frame having diverging sides, the handle hinged upon the rear end of the frame, the slotted brace or cross-bar near the outer end of the same, the guide-bolts in the outer ends of the diverging arms, the drive-wheel having scalloped sides or faces, the movable arms or levers pivoted upon the frame on opposite sides of the scalloped drive-wheel, and having friction-rollers bearing against the sides of the same, and the cutters pivoted in the outer ends of the movable arms or levers, one above the other, and having slots in their outer ends, through which the guide-bolts are inserted, substantially as and for the purpose herein shown and set forth.

In testimony that I claim the foregoing as my own I have hereunto affixed my signature in presence of two witnesses.

LAURISTON S. BROWN.

Witnesses:
HARRY H. HATHEWAY,
KENT J. WILLARD.